US010191468B2

(12) United States Patent
Tezuka et al.

(10) Patent No.: US 10,191,468 B2
(45) Date of Patent: Jan. 29, 2019

(54) TOOL TRACK DISPLAY DEVICE FOR DISPLAYING TRACK OF TOOL

(71) Applicant: FANUC CORPORATION, Yamanashi (JP)

(72) Inventors: Junichi Tezuka, Yamanashi (JP); Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 852 days.

(21) Appl. No.: 14/691,635

(22) Filed: Apr. 21, 2015

(65) Prior Publication Data

US 2015/0309499 A1    Oct. 29, 2015

(30) Foreign Application Priority Data

Apr. 23, 2014  (JP) .................................. 2014-089152

(51) Int. Cl.
| | |
|---|---|
| G06F 19/00 | (2018.01) |
| G05B 19/19 | (2006.01) |
| G05B 19/409 | (2006.01) |

(52) U.S. Cl.
CPC .......... *G05B 19/19* (2013.01); *G05B 19/409* (2013.01); *G05B 2219/32128* (2013.01); *G05B 2219/35321* (2013.01); *G05B 2219/35349* (2013.01); *G05B 2219/50118* (2013.01)

(58) Field of Classification Search
CPC ..................................................... G05B 19/19
USPC ......................................................... 700/181
See application file for complete search history.

(56) References Cited

U.S. PATENT DOCUMENTS

| | | | | |
|---|---|---|---|---|
| 2011/0015877 | A1* | 1/2011 | Okita ................... | G05B 19/409 702/41 |
| 2013/0076287 | A1* | 3/2013 | Iwashita ............ | G05B 19/4068 318/561 |
| 2014/0100688 | A1* | 4/2014 | Tezuka ................. | G05B 19/404 700/186 |

FOREIGN PATENT DOCUMENTS

| | | |
|---|---|---|
| CN | 102375431 A | 3/2012 |
| CN | 102736555 A | 10/2012 |
| CN | 102789197 A | 11/2012 |
| DE | 102013016489 A1 | 4/2014 |
| JP | H02257308 A | 10/1990 |

(Continued)

OTHER PUBLICATIONS

English Machine Translation of JP 2004-021954 published on Jan. 22, 2004, 6 pages.

(Continued)

*Primary Examiner* — Mohammad Ali
*Assistant Examiner* — Md Azad
(74) *Attorney, Agent, or Firm* — Fredrikson & Byron, P.A.

(57) ABSTRACT

A tool track display device includes a position information acquisition unit which acquires position information of at least one drive axle from a numerical control device and a position sensor provided on the at least one drive axle, a tool coordinate calculation unit which calculates coordinate values of the tool based on the position information of the at least one drive axle and information regarding the mechanical structure of a machine tool, a display attribute modification unit which modifies the display attribute of the tool track in accordance with the motion direction of the tool, and a display unit which displays the tool track based on the coordinate values of the tool calculated by the tool coordi- (Continued)

nate calculation unit and the display attribute modified by the display attribute modification unit.

4 Claims, 7 Drawing Sheets

(56) References Cited

FOREIGN PATENT DOCUMENTS

| JP | 2004021954 A | 1/2004 |
|---|---|---|
| JP | 3834268 B2 | 7/2006 |
| JP | 2011165066 A | 8/2011 |
| JP | 2013257809 A | 12/2013 |

OTHER PUBLICATIONS

English Abstract and Machine Translation for Chinese Publication No. 102789197 A, published Nov. 21, 2012, 8 pgs.
English Abstract and Machine Translation for Chinese Publication No. 102736555 A, published Oct. 17, 2012, 16 pgs.
English Abstract and Machine Translation for Chinese Publication No. 102375431 A, published Mar. 14, 2012, 9 pgs.
English Abstract and Machine Translation for German Publication No. 10 2013 016 489 A1, published Apr. 10, 2014, 9 pgs.
Untranslated Decision to Grant for JP2014-089152, dated Jan. 5, 2016, 3 pages.
Translated Decision to Grant for JP2014-089152, dated Jan. 5, 2016, 3 pages.
Untranslated Notification of Reasons for Refusal for JP2014-089152, dated Sep. 29, 2015, 4 pages.
Translated Notification of Reasons for Refusal for JP2014-089152, dated Sep. 29, 2015, 4 pages.
English Abstract and Machine Translation for Japanese Publication No. 3834268 B2, published Jul. 28, 2006, 11 pgs.
English Translation of Japanese Publication No. 2013257809, published Dec. 26, 2013, 17 pages.
English Translation of Japanese Publication No. 2011165066, published Aug. 25, 2011, 23 pages.
English Translation of Abstract for Japanese Publication No. H02257308, published Oct. 18, 1990, 1 page.

* cited by examiner

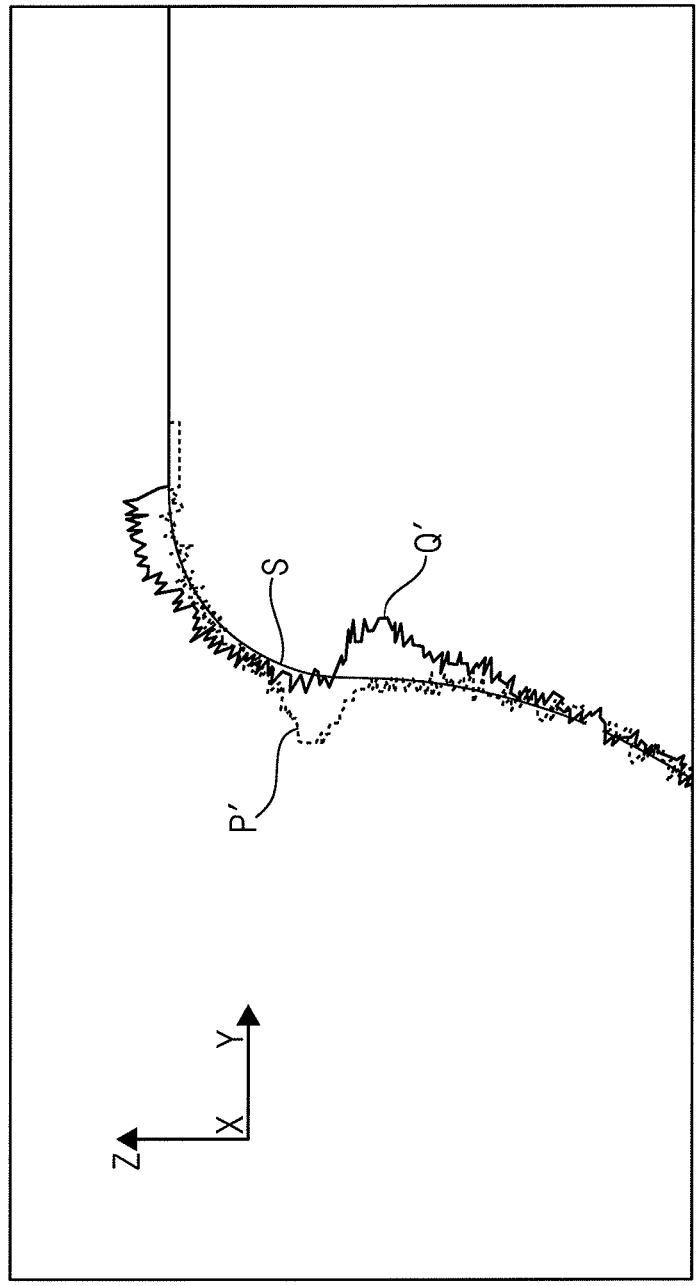

TOOL TRACK DISPLAY DEVICE FOR DISPLAYING TRACK OF TOOL

BACKGROUND OF THE INVENTION

1. Technical Field of the Invention

The present invention relates to a tool track display device which displays a track of a tool for a machine tool which machines a workpiece while reciprocally moving the tool and/or the workpiece relative to each other by at least one drive axle using a numerical control (NC) device.

2. Description of the Related Art

Conventionally, there are track display devices in which a track of a tool is indicated in different display attributes to examine the cause of a flaw which occurs in the actual track.

In Japanese Patent No. 3834268, the tool track is indicated by a set of minute line segments. The inclination of each minute line segment with respect to a specific axis is judged and the tool track consisting of a set of minute line segments is indicated using a display attribute which is determined in accordance with the judged inclination. In this case, the unevenness which occurs in the tool track can be easily determined.

In a machine tool in which machining is performed by controlling a plurality of servo shafts, there are cases where a workpiece is machined while a tool is reciprocally moved relative to the workpiece. In such a machining operation, when a commanded curve for the tool consists of a plurality of curves having different curvatures, the normal acceleration changes stepwise at the junctions between the curves. As a result, the influence of the acceleration change changes depending on the motion direction of the tool, so that the position where a track deviation between the commanded track and the actual track increases and the amount of the track deviation change.

Therefore, even if the profile of the commanded track is the same, the track deviation differs between the forward path and the return path. Nevertheless, in conventional track display devices, the commanded track and the actual track are displayed as they are without distinguishing the forward path and the return path. Consequently, it is impossible to correlate the track deviation with the motion direction, and accordingly, it is difficult to determine whether or not a track deviation has occurred based on the servo adjustment or on the motion direction.

Note that in Japanese Patent No. 3834268, the tool track is displayed based on NC data produced by the CAD, etc. Accordingly, it is impossible to display the NC-commanded track and the actual track of the movement of the tip point of the tool. Therefore, in Japanese Patent No. 3834268, it is impossible to confirm the track deviation between the commanded track and the actual track, and accordingly, an appropriate servo control cannot be performed to eliminate the track deviation.

Moreover, in Japanese Patent No. 3834268, the display attribute can be modified in accordance with the inclinations of the minute line segments, but it is impossible to modify the display attribute depending on the motion direction (forward motion or return motion). Therefore, whether the track deviation is caused due to the servo control or due to the motion direction cannot be correctly determined.

Under these circumstances, it is an object of the present invention to provide a tool track display device which is capable of correlating the track deviation and the motion direction so as to effectively perform servo control.

SUMMARY OF THE INVENTION

To achieve the aforementioned object, according to the present invention, there is provided a tool track display device which displays a track of a tool of a machine tool wherein a workpiece is machined through reciprocal and relative movement between the tool and the workpiece by at least one drive axle using a numerical control device, comprising a position information acquisition unit which acquires position information of the at least one drive axle from the numerical control device and a position sensor provided on the at least one drive axle or position information of the at least one drive axle from the position sensor, a tool coordinate calculation unit which calculates coordinate values of the tool based on the position information of the at least one drive axle and information regarding the mechanical structure of the machine tool, a display attribute modification unit which modifies the display attribute of the tool track in accordance with the motion direction of the tool, and a display unit which displays the track of the tool based on the coordinate values of the tool calculated by the tool coordinate calculation unit and the display attribute modified by the display attribute modification unit.

According to the second embodiment of the invention, a tool track display device according to the first embodiment further comprises an inverse position acquisition unit which acquires an inverse position in which the motion direction of the tool is inverted from the numerical control device or an operation program of the machine tool, wherein the display attribute modification unit modifies the display attribute of the tool track in accordance with the inverse position.

According to the third embodiment of the invention, a tool track display device according to the first embodiment further comprises an inverse position input unit which is adapted to externally designate the inverse position where the motion direction of the tool is inverted, wherein the display attribute modification unit modifies the display attribute of the tool track in accordance with the designated inverse position.

According to the fourth embodiment of the invention, in a tool track display device according to any one of the first to third embodiments, the display unit superimposedly displays the commanded track of the tool obtained from the position information acquired from the numerical control device with the actual track obtained from the position information acquired from the position sensor.

According to the fifth embodiment of the invention, in a tool track display device according to any one of the first to fourth embodiments, the display attribute modification unit modifies the display attribute of the tool track between the forward path and return path of the reciprocal movement.

According to the sixth embodiment of the invention, in a tool track display device according to any one of the first to fifth embodiments, the display attribute modification unit additionally displays symbols, characters, or character strings corresponding to the forward path and the return path of the reciprocal movement on the display unit.

The aforementioned objects, features, and advantageous merits and other objects, features, and advantageous merits of the present invention will become clearer from the detailed description of the representative embodiments of the present invention illustrated in the accompanying drawings.

BRIEF DESCRIPTION OF THE DRAWINGS

FIG. 5 is a diagram showing a commanded track and an actual track consisting of a forward path and a return path;

DETAILED DESCRIPTION

Figure 1:
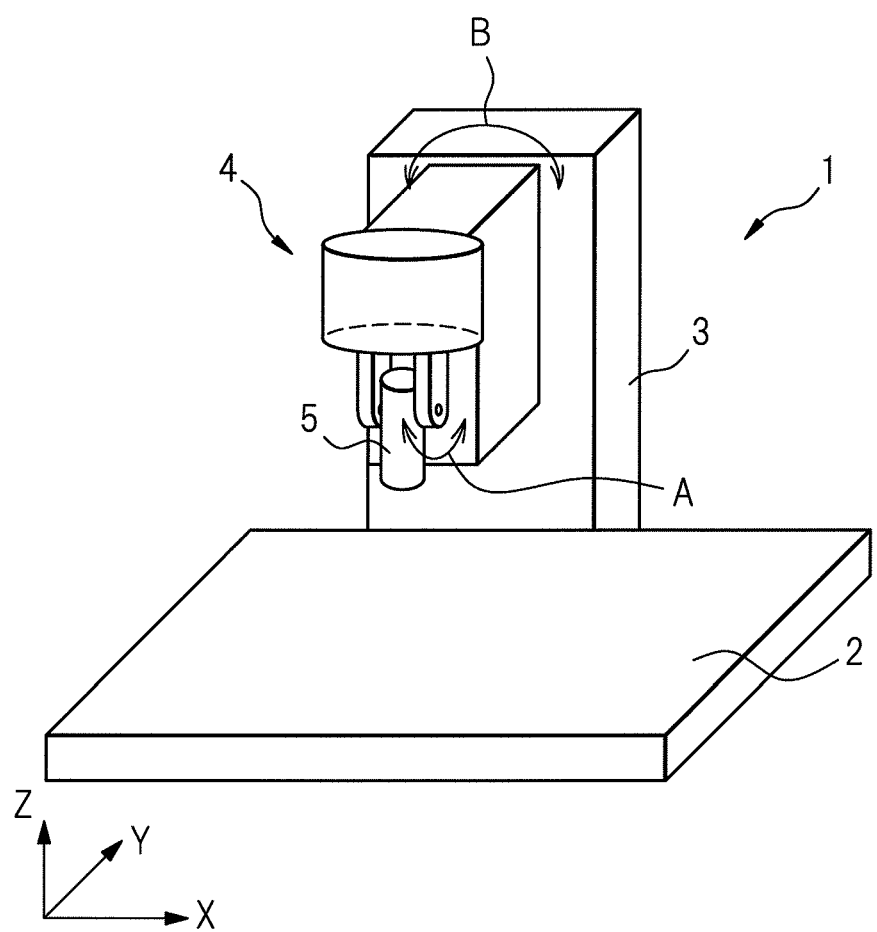
FIG. 1 is a perspective view of a machine tool having a tool track display device according to the present invention mounted thereon.

In the drawings, the same reference numerals are assigned to corresponding components. For clarity, the scale of the drawings differs appropriately.

FIG. 1 is a perspective view of a machine tool on which a tool track display device according to the present invention is mounted. The machine tool 1 shown in FIG. 1 by way of example is a 5-axis machine tool. The machine tool 1 is composed of a table 2 on which a workpiece (not shown) can be placed, and a support post 3 which is relatively movable in three orthogonal directions (X-axis, Y-axis, Z-axis) perpendicular to the table 2. As can be seen in FIG. 1, a head 4 extends laterally from the support post 3 and is rotatable about the axis B parallel with the surface of the table 2. Moreover, a tool 5 which is rotatable about the axis "A" perpendicular to both the axis B and the surface of the table 2 is attached to the head 4.

Therefore, the machine tool 1 machines the workpiece on the table 2 by controlling the position and posture of the tool 5 by means of the three linear motion shafts (X-axis, Y-axis, Z-axis) and the two rotary shafts (axis A and axis B). It should be noted that an alternative arrangement in which the tool 5 is secured to the table 2 and the workpiece (not shown) is attached to the front end of the head 4 is included in the scope of the present invention. The axis X, the axis Y, the axis Z, the axis A, and the axis B may be referred to hereinafter as "drive axles".

Figure 2:
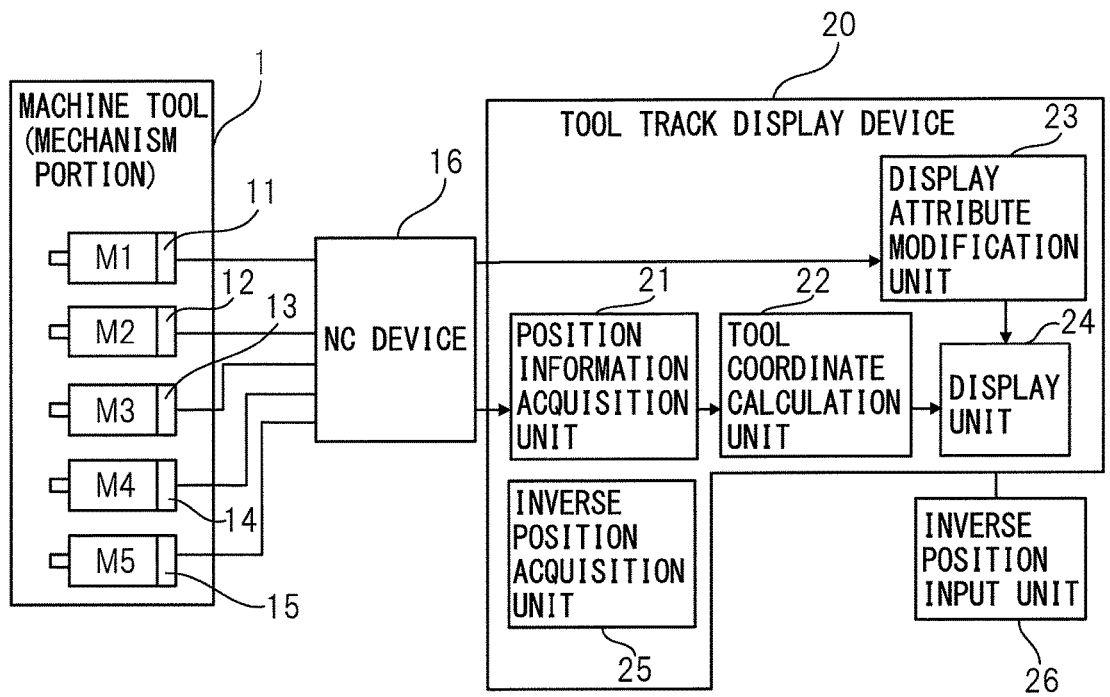
FIG. 2 is a function block diagram of a tool track display device according to the present invention.

FIG. 2 shows a function block diagram of the tool track display device according to the present invention. As shown in FIG. 2, the tool track display device 20 is connected to the machine tool 1 through a numerical control (NC) device 16. The machine tool 1 includes motors M1 to M5 which drive the respective drive axles. The motors M1 to M5 are respectively provided with position sensors 11 to 15 which detect the actual positions of the drive axles at a predetermined control cycle. The NC device 16 creates a position command for each drive axle at the predetermined control cycle, in accordance with the operation program of the machine tool 1.

As can be seen in FIG. 2, the tool track display device 20 includes a position information acquisition unit 21 which acquires the position commands created in the NC device 16 at a predetermined control cycle as position information. In addition, position information acquisition unit 21 acquires the position detected values detected by position sensors 11 to 15 as position information. The position information is temporarily stored in chronological order in the tool track display device 20.

The tool track display device 20 includes a tool coordinate calculation unit 22 which calculates commanded tool coordinate values of the tip point of the tool 5 in accordance with the position information of the position command and the structure of the machine tool 1, corresponding to the position information of the position command. Furthermore, the tool coordinate calculation unit 22 calculates the actual tool coordinate values of the tip point of the tool 5 in accordance with the position information of the position detection value and the structure of the machine tool 1, corresponding to the position information of the position detection value. The commanded tool coordinate values and the actual tool coordinate values represent the commanded track and actual track of the tip point of the tool 5, respectively. Note that, the structure of the machine tool 1 mainly refers to the size thereof.

Moreover, the tool track display device 20 includes a display attribute modification unit 23 which modifies the display attribute of the tool track in accordance with the motion direction of the tool 5, as will be discussed below. Moreover, the tool track display device 20 includes a display unit 24 which displays the track of the tool 5 based on the coordinate values of the tool 5 calculated by the tool coordinate calculation unit 22 and the display attribute modified by the display attribute modification unit 23.

Furthermore, the tool track display device 20 includes an inverse position acquisition unit 25 which acquires an inverse position in which the motion direction of the tool 5 is inverted from the NC device 16 or the operation program of the machine tool 1. As can be seen in FIG. 2, an inverse position input unit 26, such as a keyboard, a mouse, a touch panel, through which an operator can externally designate the inverse position where the motion direction of the tool 5 is inverted is connected to the tool track display device 20.

Figure 3:
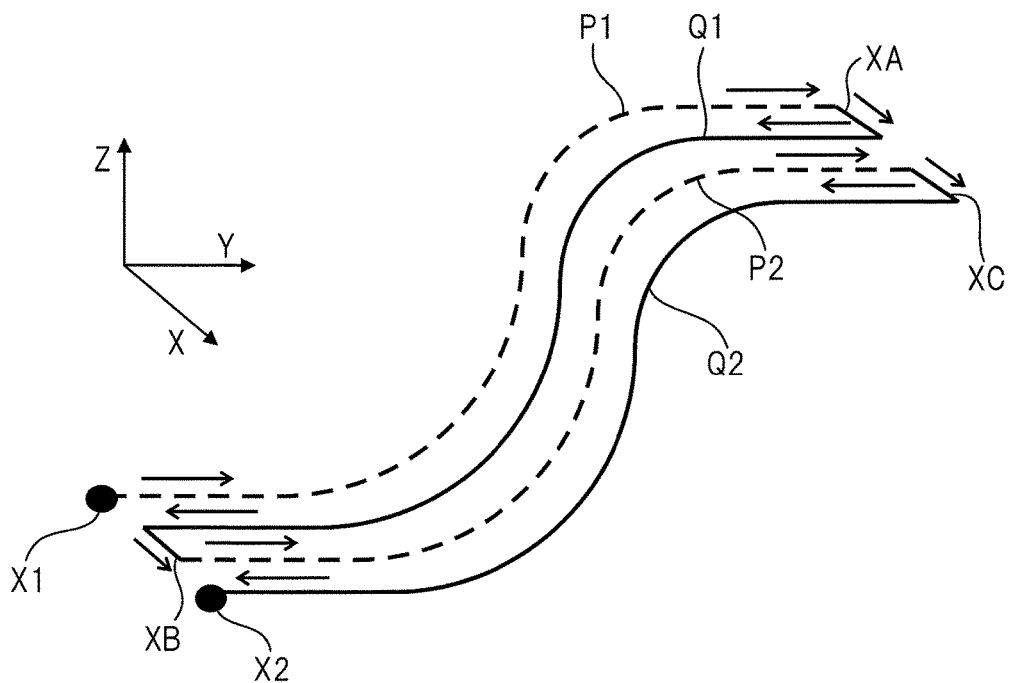
FIG. 3 is a schematic view of an example of a motion path of a tool along which a machining tool having mounted thereon a tool track display device according to the present invention machines a workpiece.

FIG. 3 shows the machining route along which the machine tool on which the tool track display device according to the present invention is mounted machines the workpiece, by way of example. In the embodiment illustrated in FIG. 3, the machining by the tool 5 of the machine tool 1 begins at the machining start point X1 and proceeds along the curved forward path P1. The tool 5 is moved by the amount represented by a line segment XA in the direction X at the terminal end of the forward path P1 and thereafter, is moved along the curved return path Q1 to machine the workpiece. The tool 5 is stopped at the point spaced from the machining start point X1 at a distance of the line segment XA in the direction X.

Thereafter, the tool 5 is moved by the amount represented by a line segment XB in the direction X at the terminal end of the return path Q1 and thereafter, is moved along the curved forward path P2 to machine the workpiece. The tool 5 is moved by the amount represented by a line segment XC in the direction X at the terminal end of the forward path P2 and thereafter, is moved along the curved return path Q2 to machine the workpiece. The tool 5 is stopped at the machining terminal point X2. As may be understood from the foregoing, the workpiece is machined by the tool which reciprocally moves along the machining route consisting of the curved forward paths P1 and P2 and the curved return paths Q1 and Q2.

As can be seen in FIG. 3, the forward paths P1 and P2 and the return paths Q1 and Q2, each consisting of a plurality of curved line portions have the same shape. In other words, it is assumed in FIG. 3 that the workpiece is repeatedly machined along the same route while moving the tool and/or the workpiece relative to each other in the direction X. Note that, the length of the line segments XA, XB, XC can be zero.

Figure 4A:
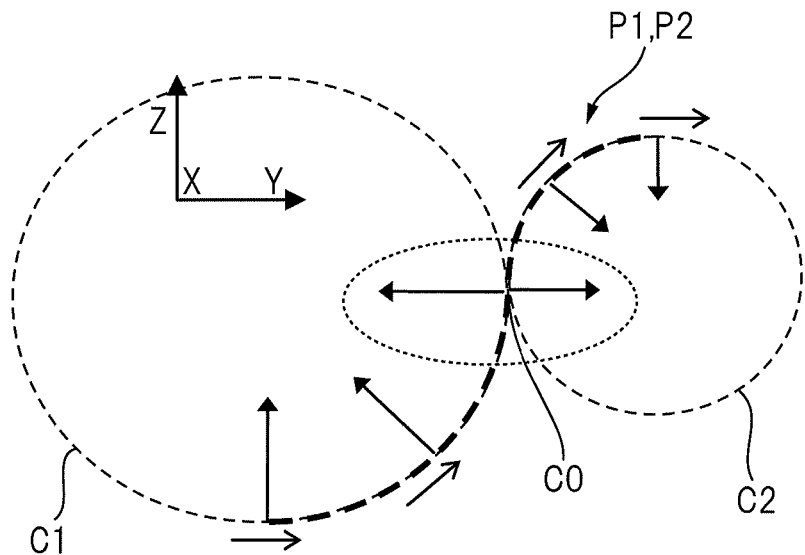
FIG. 4A is an enlarged partial view of a forward path curve shown in FIG. 3.
Figure 4B:
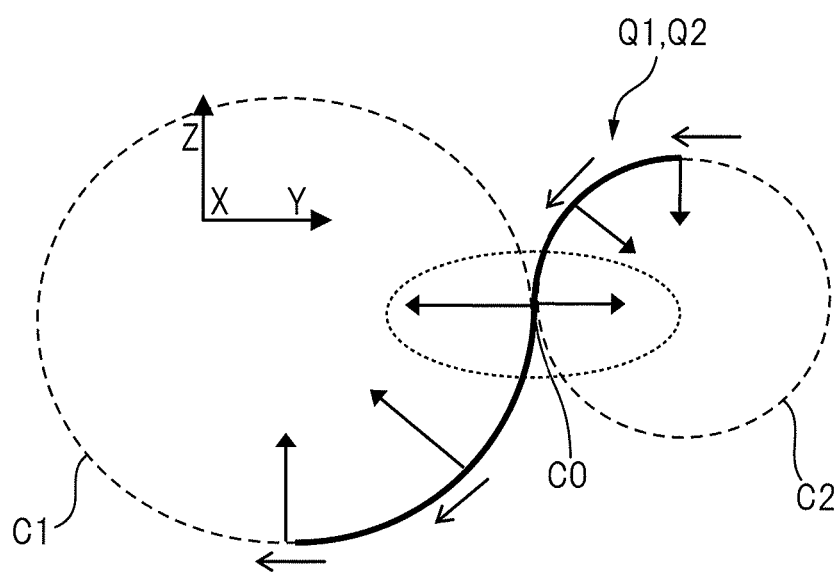
FIG. 4B is an enlarged partial view of a return path curve shown in FIG. 3.

FIGS. 4A and 4B are enlarged partial views of the curved forward paths and the curved return paths shown in FIG. 3, respectively. In FIGS. 4A, 4B, two circles C1 and C2 which externally contact with each other at a tangent point C0 are indicated. The curved forward paths P1, P2 and the curved return paths Q1, Q2 are defined by a part of each of the circles C1 and C2. FIGS. 4A and 4B also show normal accelerations represented by line segments extending toward the centers of the circles C1 and C2, respectively.

As can be seen in FIG. 4A, when the tool passes through the tangential point C0 during the movement along the forward paths P1, P2, the direction of the normal acceleration is inverted from the left direction to the right direction. Likewise, as shown in FIG. 4B, when the tool passes through the tangential point C0 during the movement along the return paths Q1, Q2, the direction of the normal acceleration is inverted from the right direction to the left direction. When the direction in which the normal acceleration is inverted differs between the forward path and the return path, as mentioned above, even if the commanded track is the same, the position in which the track deviation occurs and the amount of deviation differ between the forward path and the return path.

FIG. 5 shows the commanded track and the actual tracks in the forward and return paths by way of example. In FIG. 5, the central smooth solid curve S represents the commanded track common to the forward paths P1, P2 and the return paths Q1, Q2. The dotted curve P' represents the actual track in the forward path P1 or P2 and the solid curve Q' represents the actual track in the return path Q1 or Q2.

As may be understood from FIG. 5, each of the dotted curve P' and the solid curve Q' has a protrusion. The protrusions occur in the vicinity of the tangential point C0 shown in FIGS. 4A, 4B. The protrusions correspond to the portions where the track deviation is large between the commanded track and the actual tracks. However, the directions of the protrusions differ between the dotted curve P' and the solid curve Q'. Moreover, the positions at which the protrusions occur differ between the dotted curve P' and the solid curve Q'.

In conventional tool track display devices, the track in the forward path and the track in the return path are not distinguishably displayed. In other words, in the prior art, the track deviation is not correlated with the motion direction. Consequently, it is impossible to determine whether or not the track deviation, if any, between the commanded track and the actual track occurs in the forward path or in the return path. Moreover, it is impossible to determine whether or not the cause of the track deviation is based on the motion direction or on servo adjustment. It is an object of the present invention to eliminate these drawbacks of the prior art.

Figure 6:
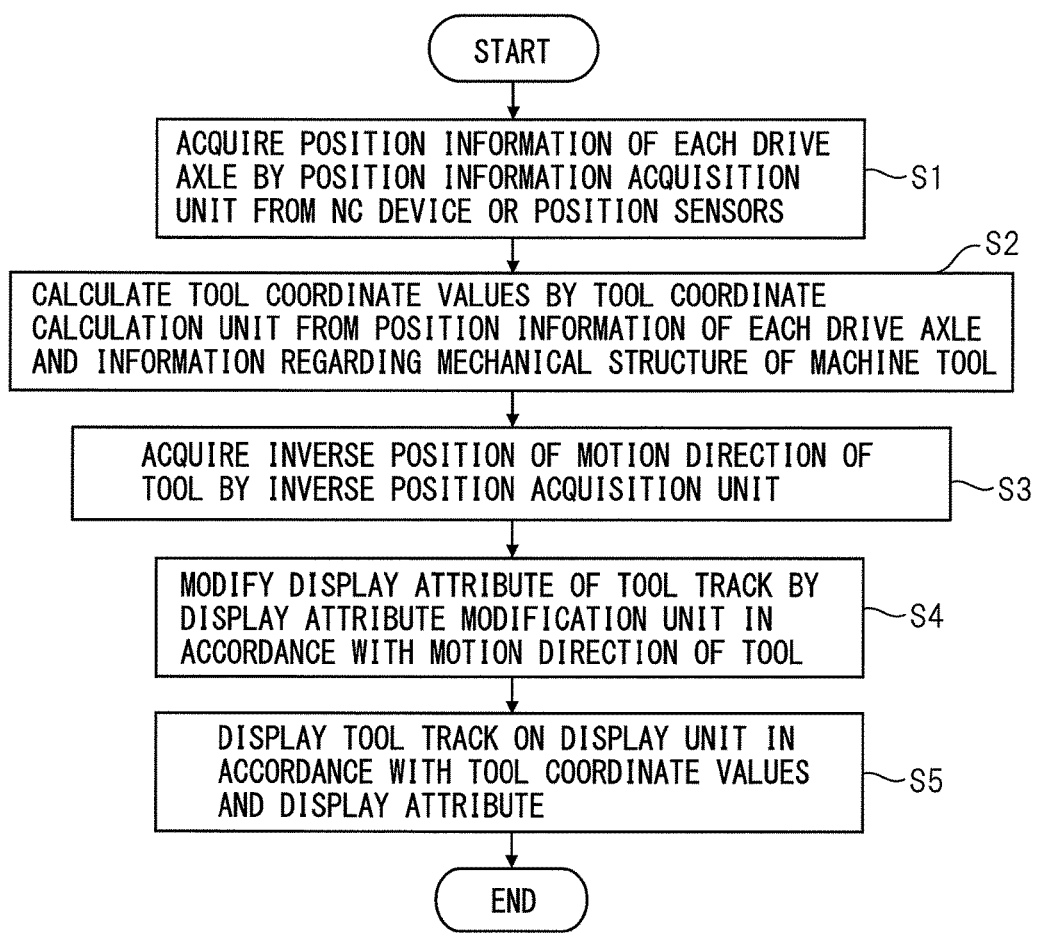
FIG. 6 is a flow chart showing the operation of a tool track display device according to the present invention.

FIG. 6 shows a flow chart of the operation of the tool track display device according to the present invention. First, at step S1, the position information acquisition unit 21 acquires the position commands created in the numerical control device 16 at a predetermined control cycle as position information. The position information acquisition unit 21 may acquire position detection values of the drive axles detected by the respective position sensors 11 to 15, as position information. The position information of the position commands is used to calculate the commanded track, and the position information of the position detection values is used to calculate the actual tracks. Note that, when only the actual tracks should be referred to, it is sufficient that only the position information of the position detection values is used.

Thereafter, at step S2, the tool coordinate calculation unit 22 calculates commanded tool coordinate value Pcn of the tip point of the tool 5 corresponding to the position information of the position commands based on the position information of the position commands and the structure of the machine tool 1. Moreover, the tool coordinate calculation unit 22 calculates the actual tool coordinate value of the tip point of the tool 5 corresponding to the position information of the position detection values based on the position information of the position detection values and the structure of the machine tool 1.

The commanded tool coordinate value and the actual tool coordinate value are calculated as follows.

With reference to FIG. 1, the coordinates of the five drive axles are x(t), y(t), z(t), a(t), and b(t), respectively.

The coordinates of the intersection point between the axes A and B are represented by (x(t), y(t), z(t)). When it is assumed that the distance from the intersection point to the tip end of the tool 5 is L and that the position in which the tool 5 is oriented vertically downwardly is a reference position (origin) of the axes A and B, the coordinates of the tip point of the tool 5 are represented as follows.

$$Px(t)=X(t)+L \times \cos(a(t)) \times \sin(b(t))$$

$$Py(t)=y(t)+L \times \sin(a(t))$$

$$Pz(t)=z(t)-L \times \cos(a(t)) \times \cos(b(t))$$

Thus, the coordinates of the tip point of the tool 5 can be calculated based on the position information of the five drive axles and the conditions of the mechanical structure.

At step S3, the inverse position acquisition unit 25 acquires an inverse position in which the motion direction of the tool 5 is inverted from the NC device 16 or the machining program of the machine tool 1. The inverse position refers to a position where a change of the tip point of the tool 5 from the forward path to the return path or from the return path to the forward path occurs and corresponds to each of both ends of each of the line segments XA, XB and XC shown in FIG. 3.

Specifically, the inverse position acquisition unit 25 acquires the inverse position with reference to the position commands of the NC device 16 or the machining program of the machine tool 1. For example, program Nos. or block Nos. on the machining program at which changes from the forward path to the return path occur, or signals representing the inverse positions output from the NC device 16 are acquired. When the inverse position acquisition unit 25 is used, the portions where the display attributes of the tool track change can be made distinguishable.

Alternatively, the inverse positions may be externally input by an operator using an inverse position input unit 26. The inverse position input unit 26 can be used for example when the inverse positions are numerically designated using the coordinates or when the inverse positions are designated based on the tool track displayed on the display unit 24. It should be understood that when the inverse position input unit 26 is used, the portion where the display attributes of the tool track change can be easily distinguished.

After that, at step S4, a display attribute modification unit 23 modifies the display attribute of the tool track in accordance with the motion direction of the tool 5. Upon modification, the acquired inverse positions are appropriately used. The display attribute can include a color, the type of line, and the thickness, of the track. The display attribute modification unit 23 selects any of first to third display attributes, which will be discussed hereinafter, in accordance with the input operation by the operator. Other display attributes (not shown) may be selected. At step 5, the tool track is displayed on the display unit 24 in accordance with the coordinate values Pcn, Pfn of the tool and the selected display attribute.

Figure 7A:
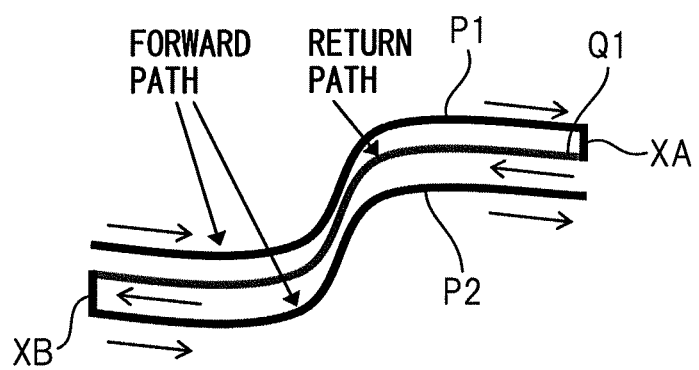
FIG. 7A is a schematic view showing a first display attribute.
Figure 7B:
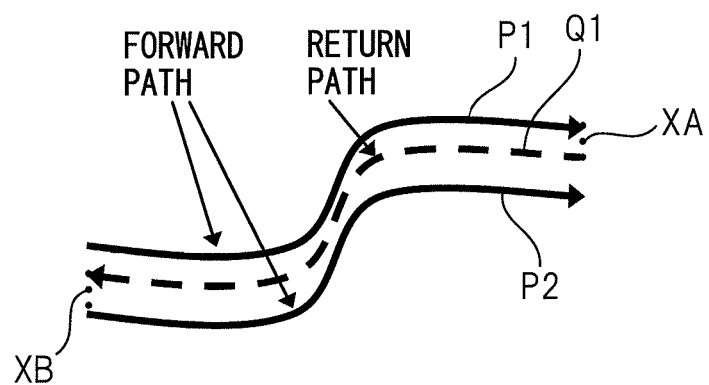
FIG. 7B is a schematic view showing a second display attribute.
Figure 7C:
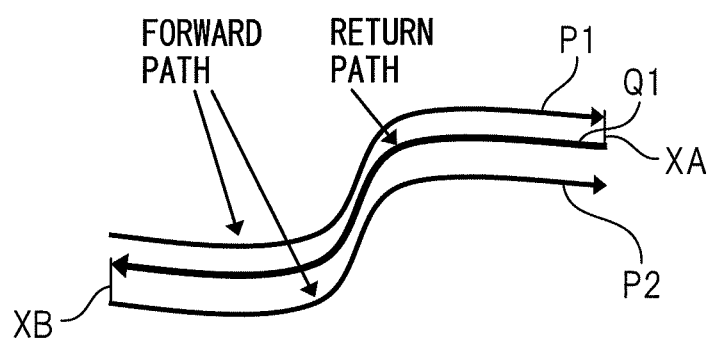
FIG. 7C is a schematic view showing a third display attribute.

FIGS. 7A to 7C show the first to third display attributes, respectively. In these figures, for clarity, the return path Q2 and the line segment XC in the direction X shown in FIG. 3 are omitted and only the curved forward paths P1 and P2 and the curved return path Q1 are illustrated. As can be seen in FIGS. 7A to 7C, the curved forward paths P1, P2 and the curved return path Q1 are superimposedly displayed.

In the first display attribute shown in FIG. 7A, the words "forward path" are assigned, together with the arrow, to each of the forward paths P1 and P2, and the words "return path" are assigned, together with the arrow to the return path Q1. Also, in the first display attribute shown in FIG. 7A, the motion directions are indicated by the arrows along the curved forward paths P1 and P2 and the curved return path Q1. Furthermore, in the first display attribute, the curved forward paths P1, P2, the curved return path Q1, and the line segments XA, XB are indicated by different colors or different gradations of color. For example, the curved forward paths P1 and P2 may be colored in blue and the curved return path Q1 may be colored in red.

In the second display attribute shown in FIG. 7B, the words "forward path" are assigned, together with the arrow, to each of the forward paths P1 and P2, and the words "return path" are assigned, together with the arrow to the return path Q1. Also, in the second display attribute shown in FIG. 7B, the motion directions are indicated by the arrows along the curved forward paths P1 and P2 and the curved return path Q1. Furthermore, in the second display attribute, the curved forward paths P1, P2, the curved return path Q1, and the line segments XA, XB are indicated by different types of line. In FIG. 7B, the curved forward paths P1 and P2 are indicated by solid lines and the curved return path Q1 is indicated by a dashed line, and the line segments XA and XB are indicated by dotted lines.

In the third display attribute shown in FIG. 7C, the words "forward path" are assigned, together with the arrow, to each of the forward paths P1 and P2, and the words "return path" are assigned, together with the arrow to the return path Q1. Also, in the third display attribute shown in FIG. 7C, the motion directions are indicated by the arrows along the curved forward paths P1 and P2 and the curved return path Q1. Furthermore, in the third display attribute, the curved forward paths P1, P2, the curved return path Q1, and the line segments XA, XB are indicated by lines having different thicknesses. In FIG. 7C, the curved forward paths P1 and P2 are indicated by medium thickness lines, the curved return path Q1 is indicated by a thick line, and the line segments XA and XB are indicated by thin lines.

As may be understood from the foregoing, according to the present invention, the track of the forward path and the track of the return path are displayed in different display attributes. Thus, in the present invention, at least the forward path and the return path are distinguishably displayed in accordance with the display attributes. Therefore, in the present invention, the track deviation is correlated with the motion direction. As a result, it is possible for the operator to easily recognize the motion direction of the tool 5 and to easily understand that the displayed track is the forward path or the return path.

Furthermore, as the commanded track and the actual tracks are superimposedly displayed, the operator can easily understand the track deviation between the commanded track and the actual tracks. When there is a large track deviation, it is possible to determine whether or not the track deviation occurs in the forward path or in the return path. Moreover, it is possible to determine whether or not the cause of the track deviation is based on the motion direction or on the servo adjustment. Therefore, it will be understood that according to the present invention, the servo adjustment can be effectively carried out.

Advantageous Effects of the Invention

According to the first embodiment of the present invention, as the display attributes of the tool track are changed in accordance with the motion direction of the tools, it is possible to correlate the track deviation with the motion direction, and accordingly, the servo control can be effectively performed.

According to the second embodiment of the present invention, the portions where the display attribute of the tool track changes can be made obvious by the inverse position acquisition unit.

According to the third embodiment of the present invention, the portions where the display attribute of the tool track changes can be easily made obvious by the inverse position input unit.

According to the fourth embodiment of the present invention, the track deviation between the commanded track and the actual track can be easily understood.

According to the fifth embodiment of the present invention, the forward path and the return path can be easily distinguished from each other.

According to the sixth embodiment of the present invention, the motion direction of the tools can be easily understood.

Although the present invention has been discussed hereinabove with reference to the representative embodiments, it will be understood that the aforementioned modifications and other various modifications, eliminations or additions can be performed by a person skilled in the relevant art without departing from the spirit of the invention.

What is claimed is:

1. A tool track display device which displays a track of a tool of a machine tool wherein a workpiece is machined through reciprocal and relative movement between the tool and the workpiece by at least one drive axle using a numerical control device, comprising;
   a position information acquisition unit which acquires position information created in the numerical control device at a predetermined control cycle or position information of the at least one drive axle from the position sensor,
   a tool coordinate calculation unit which calculates coordinate values of the tool based on the position information of the at least one drive axle and information regarding the mechanical structure of the machine tool,
   a display attribute modification unit assigning a display attribute to the position information of the at least one drive axle from the position sensor based on the motion direction of the tool,
   a display unit which displays the track of the tool based on the coordinate values of the tool calculated by the tool coordinate calculation unit and the display attribute assigned by the display attribute modification unit;

an inverse position acquisition unit which acquires an inverse position in which the motion direction of the tool is inverted from the numerical control device or an operation program of the machine tool, wherein said display attribute modification unit modifies the display attribute of the tool track in accordance with the inverse position.

2. The tool track display device according to claim 1, wherein said display unit superimposedly displays the commanded track of the tool obtained from the position information acquired from the numerical control device with the actual track obtained from the position information acquired from the position sensor.

3. The tool track display device according to claim 1, wherein said display attribute modification unit modifies the display attribute of the tool track between the forward path and return path of the reciprocal movement.

4. The tool track display device according to claim 1, wherein said display attribute modification unit additionally displays symbols, characters, or character strings corresponding to the forward path and the return path of the reciprocal movement on the display unit.

\* \* \* \* \*